United States Patent
Sugita et al.

(10) Patent No.: US 10,884,436 B2
(45) Date of Patent: Jan. 5, 2021

(54) FLOW RATE SIGNAL CORRECTION METHOD AND FLOW RATE CONTROL DEVICE EMPLOYING SAME

(71) Applicant: FUJIKIN INCORPORATED, Osaka (JP)

(72) Inventors: Katsuyuki Sugita, Osaka (JP); Nobukazu Ikeda, Osaka (JP); Kouji Nishino, Osaka (JP); Kaoru Hirata, Osaka (JP); Masahiko Takimoto, Osaka (JP); Masayoshi Kawashima, Osaka (JP); Takahiro Imai, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 351 days.

(21) Appl. No.: 15/771,148

(22) PCT Filed: Oct. 24, 2016

(86) PCT No.: PCT/JP2016/004662
§ 371 (c)(1),
(2) Date: Apr. 26, 2018

(87) PCT Pub. No.: WO2017/073038
PCT Pub. Date: May 4, 2017

(65) Prior Publication Data
US 2018/0314271 A1 Nov. 1, 2018

(30) Foreign Application Priority Data

Oct. 28, 2015 (JP) .................. 2015-211800

(51) Int. Cl.
*G05D 7/06* (2006.01)
*G01F 15/00* (2006.01)
*G01F 1/36* (2006.01)

(52) U.S. Cl.
CPC ........... *G05D 7/0635* (2013.01); *G01F 1/363* (2013.01); *G01F 15/005* (2013.01)

(58) Field of Classification Search
CPC ...... G05D 7/0635; G05D 7/06; G01F 15/005; G01F 1/363
See application file for complete search history.

(56) References Cited

U.S. PATENT DOCUMENTS 6,230,560 B1 * 5/2001 Suzuki .................... G01F 1/696
73/204.25
2002/0005785 A1 1/2002 Ohmi et al.
(Continued)

FOREIGN PATENT DOCUMENTS

CN 1506607 A 6/2004
CN 101583916 A 11/2009
(Continued)

OTHER PUBLICATIONS

International Search Report issued in PCT/JP2016/004662; dated Dec. 13, 2016.

*Primary Examiner* — Nathan L Laughlin
(74) *Attorney, Agent, or Firm* — Studebaker & Brackett PC

(57) ABSTRACT

A flow rate signal correction method applicable to a pressure-type flow rate control device that controls a flow rate by controlling pressure existing upstream of a restriction part includes a step of generating a primary signal indicating the flow rate in accordance with an output of a pressure sensor provided upstream of the restriction part and a step of generating a secondary signal as a corrected signal of the primary signal such that the current value of the primary signal and a value including information regarding one or a plurality of past values of the primary signal are used to derive a current value corrected according to a predetermined relational expression. The secondary signal is output (Continued)

as a flow rate signal during a stable flow rate period, and the secondary signal is not output as a flow rate signal during a transient change period.

7 Claims, 3 Drawing Sheets

(56) References Cited

U.S. PATENT DOCUMENTS

2009/0312876 A1  12/2009  Yoneda et al.
2014/0083159 A1   3/2014  Nagai

FOREIGN PATENT DOCUMENTS

| JP | H05-079873 A | 3/1993 |
| JP | 2004-212099 A | 7/2004 |
| JP | 2010-146416 A | 7/2010 |
| JP | 2014-063348 A | 4/2014 |
| JP | 2015-109022 A | 6/2015 |

* cited by examiner (a)

(b)

FLOW RATE SIGNAL CORRECTION METHOD AND FLOW RATE CONTROL DEVICE EMPLOYING SAME

TECHNICAL FIELD

The present invention relates to a flow rate signal correction method and a flow rate control device using the same, and in particular to a flow rate signal correction method applicable to a pressure-type flow rate control device used in manufacturing products such as semiconductors, chemicals, pharmaceuticals, and precision machinery components.

BACKGROUND ART

Various types of flowmeters and flow rate control devices are used in semiconductor manufacturing equipment and chemical plants in order to control the flow rate of fluids such as material gases and etching gases. Among these, pressure-type flow rate control devices are conveniently used because of their ability to highly accurately control the flow rate of various fluids such as gases with a simple mechanism that combines a piezo actuator-driven pressure control valve and a restriction part (e.g., an orifice plate).

Patent Literature 1 discloses a pressure-type flow rate control device configured to control flow rates using a pressure sensor provided upstream of a restriction part. The pressure-type flow rate control device described in Patent Literature 1 performs flow control, based on the principle that if the critical expansion condition $P1/P2 \geq$ approx. 2 is satisfied, where P1 is the gas pressure existing upstream of the restriction part, and P2 is the gas pressure existing downstream of the restriction part, then the flow velocity of gas passing through the restriction part is fixed at the speed of sound, and a flow rate Q is determined by the upstream gas pressure P1. Under this system, the flow rate Q can be highly accurately controlled by simply controlling the upstream gas pressure P1.

A specific example of the flow control using the pressure-type flow rate control device will now be described. First, the pressure P1 is measured with the pressure sensor provided on the upstream side, and the obtained measurement result is ordinarily converted into a digital signal and input to a processor. On the basis of the input measurement result, the processor obtains a flow rate Qc of gas passing through the restriction part. Since the flow rate Qc also depends on the gas temperature, in actuality the flow rate Qc is often calculated based on the pressure P1 and a gas temperature T1.

Next, a difference ΔQ between the calculated flow rate Qc and a set flow rate Qs input by a user is obtained, and a control signal corresponding to the difference ΔQ is input to a piezo actuator driver provided in the pressure control valve. In response to this, the pressure control valve opens or closes to change the upstream gas pressure P1. Thereafter, the flow rate Qc of gas and the difference ΔQ are obtained again on the basis of the output of the pressure sensor (and the temperature sensor). This operation is repeatedly performed until the difference ΔQ reaches zero, thus enabling the flow rate Qc to be controlled to the set flow rate Qs designated by the user.

PRIOR ART DOCUMENTS

Patent Literatures

Patent Literature 1: Japanese Patent Application Laid-Open No. 2004-212099

Patent Literature 2: Japanese Patent Application Laid-Open No. 5-79873

SUMMARY OF INVENTION

Problems to be Solved by Invention

The aforementioned pressure-type flow rate control device is capable of controlling the flow rate by only controlling pressure existing upstream of the restriction part, and therefore has the advantages of being hardly influenced by disturbances and having extremely good responsiveness. However, although the pressure-type flow rate control device has high responsiveness, in some cases a phenomenon was observed in which the output signal indicating the flow rate did not show a constant value, in spite of the fact that the actual gas flow rate was stable. This is considered to be a result of the drift of a digital flow rate output signal under the influence of quantization errors or the like at the time of generating the signal on the basis of the output of the pressure sensor.

In view of this, there is a demand for the pressure-type flow rate control device to output a flow rate signal with less signal drift, in particular when the flow rate is stable. As an example of such a technique for suppressing signal swings, Patent Literature 2 describes signal processing for removing noise from an electromagnetic flowmeter. Patent Literature 2, however, merely describes the fact that data is processed so that the entire output of the electromagnetic flowmeter falls within a preset range of fluctuations. Thus, if this method is applied to a pressure-type flow rate control device, responsiveness may be sacrificed.

The present invention has been achieved in order to solve the above-described problems, and it is an object of the present invention to provide a flow rate signal correction method for obtaining an appropriate flow rate output signal, and a flow rate control device using the same.

Means for Solving Problems

A flow rate output signal correction method according to an embodiment of the present invention is a flow rate signal correction method applicable to a pressure-type flow rate control device including a restriction part and being configured to control a flow rate by controlling pressure existing upstream of the restriction part. The method includes a step of generating a primary signal indicating a flow rate, in accordance with an output of a pressure sensor provided upstream of the restriction part, and a step of generating a secondary signal as a corrected signal of the primary signal such that a current value of the primary signal and a value including information regarding one or a plurality of past values of the primary signal are used to derive a current value corrected according to a predetermined relational expression. The secondary signal is output as a flow rate signal during a stable flow rate period, and the secondary signal is not output as a flow rate signal during a transient change period.

In one embodiment, the primary signal is output as a flow rate signal during the transient change period.

In one embodiment, the value including information regarding one or a plurality of past values of the primary signal is the previous value of the secondary signal.

In one embodiment, the current value of the secondary signal is derived by adding a correction change amount to the previous value of the secondary signal, the correction change amount being calculated in accordance with a difference between the current value of the primary signal and the previous value of the secondary signal.

In one embodiment, the correction change amount is obtained by dividing the difference between the current value of the primary signal and the previous value of the secondary signal by a divisor greater than 1.

In one embodiment, the step of generating the secondary signal and the step of outputting the secondary signal as a flow rate signal are continuously performed during a period of time from a starting point at which a predetermined period of time has elapsed since a change of the flow rate setting signal occurred to an end point at which a next change of the flow rate setting signal occurs.

In one embodiment, the pressure-type flow rate control device includes a control valve provided upstream of the restriction part and the pressure sensor, the control valve being subjected to feedback control using the flow rate setting signal and the output of the pressure sensor, and the primary signal being generated in accordance with the output of the pressure sensor obtained as a result of the feedback control of the control valve.

A flow rate control device according to an embodiment of the present invention outputs a flow rate signal using the flow rate signal correction method applied to any of the above-described embodiments.

Advantageous Effects of Invention

According to embodiments of the present invention, the flow rate output signal in the pressure-type flow rate control device can be corrected appropriately and can be stabilized when the flow rate is stable, without impairing responsiveness.

DESCRIPTION OF EMBODIMENTS

Embodiments of the present invention will now be described with reference to the drawings. The present invention is, however, not intended to be limited to the embodiments described below.

Figure 1:
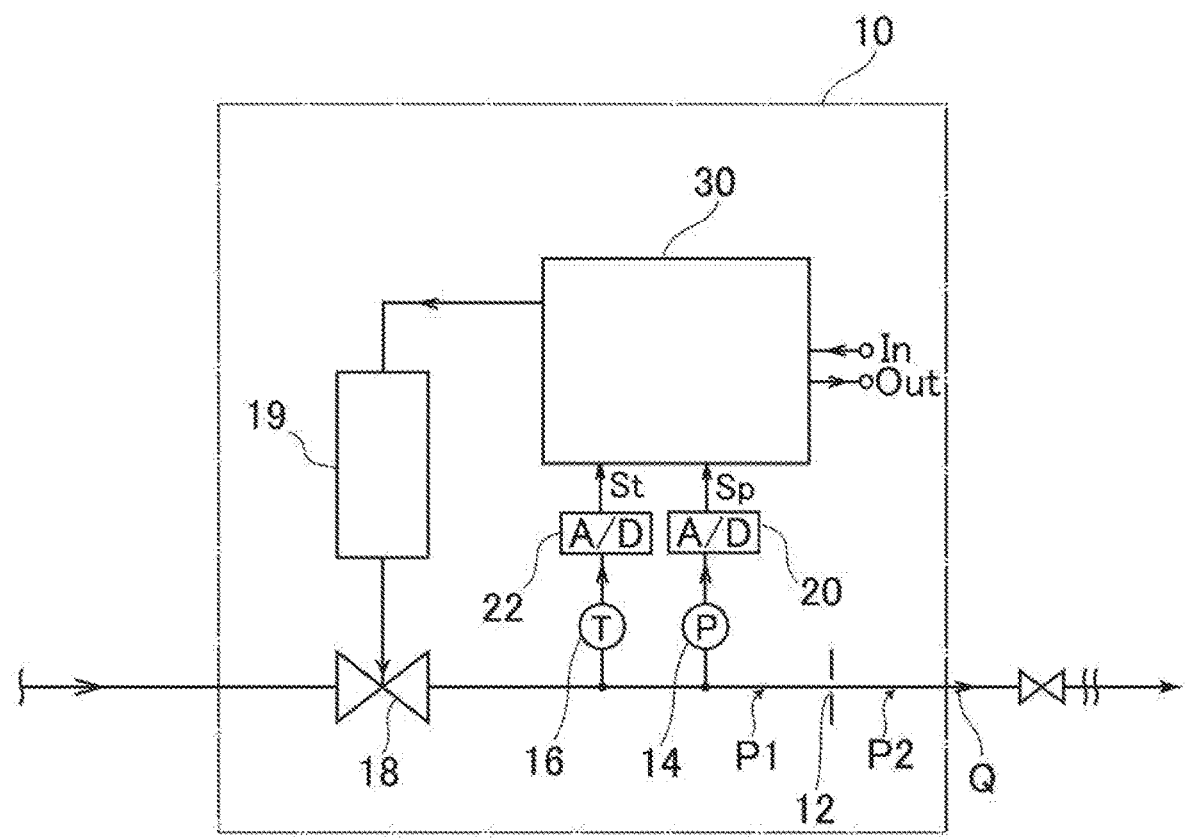
FIG. 1 is a schematic diagram schematically illustrating a configuration of a pressure-type flow rate control device according to an embodiment of the present invention.

FIG. 1 schematically illustrates a configuration of a pressure-type flow rate control device 10 according to an embodiment of the present invention. The flow rate control device 10 includes a restriction part (typically, an orifice plate) 12 having a superfine through hole, a pressure sensor 14 and a temperature sensor 16 that are provided upstream of the restriction part 12, and a control valve 18 provided upstream of the pressure sensor 14. The downstream side of the restriction part 12 is connected via an on-off valve such as a solenoid valve or an air operated valve (AOV) to a vacuum pump (not shown) for carrying out a vacuum process in semiconductor manufacturing equipment.

The pressure sensor 14 measures an upstream gas pressure P1 and outputs the obtained measurement result to an A/D converter 20. The A/D converter 20 generates a digital signal Sp that indicates the gas pressure P1 from the input measurement result and outputs this digital signal to a control circuit 30. In the flow rate control device 10, the output of the temperature sensor 16 is also converted into a digital signal by another A/D converter 22 and output to the control circuit 30.

The control circuit 30 calculates a flow rate Qc from the received digital signals, namely, the pressure signal Sp and the temperature signal St. Because the downstream pressure in the flow rate control device 10 is kept low by the vacuum pump, the flow rate Qc is calculated on the assumption that P1/P2≥approx. 2 (critical expansion condition) is satisfied, where P1 is the upstream pressure and P2 is the downstream pressure. When the critical expansion condition is satisfied, the flow rate Qc is given by the following formula.

$$Qc=S \cdot C \cdot P1/T1^{1/2}$$

where S is the cross-sectional area of the orifice, C is the constant (flow factor) determined by the physical properties of gas, and T1 is the upstream gas temperature. When the gas temperature T1 and the flow factor C are constant, the flow rate Qc can be obtained assuming that it is proportional to the upstream pressure P1. That is, for example, if the flow rate at an upstream pressure of 20 Torr is known to be 10 sccm in the case where it is considered that the type of flowing gas is fixed and the temperature remains unchanged, the flow rate can be controlled to 100 sccm by operating the control valve 18 to set the upstream pressure to 200 Torr. In this way, the pressure-type flow rate control device 10 according to the present embodiment is configured so as to be capable of controlling the flow rate by controlling the pressure P1 existing upstream of the restriction part 12. In the case where the difference between the upstream pressure and the downstream pressure is small and the above-described critical expansion condition is not satisfied, the flow rate Qc may be calculated using a predetermined equation $Qc=KP2^m(P1-P2)^n$ (where K, m, and n are constants) based on the upstream pressure P1 and the downstream pressure P2 by obtaining the downstream pressure P2 with a pressure sensor (not shown) provided downstream of the restriction part.

With the pressure-type flow rate control device 10, a user is able to arbitrarily set a set flow rate Qs via an input device (not shown). A flow rate setting signal Ss is generated based on the user input and is input to the flow rate control device 10. In response to this, the control circuit 30 controls the opening and closing of the control valve 18 so as to control the flow rate in accordance with the flow rate setting signal Ss. The control valve 18 includes, for example, a metallic diaphragm valve element, and the control circuit 30 transmits a control signal to a piezo actuator driver (piezoelectric actuator) 19 connected to the diaphragm valve element so as to open and close the valve.

The operation of controlling the upstream pressure P1 and the flow rate Qc in accordance with the input flow rate setting signal Ss may be carried out according to a known method. For example, as described above, the gas flow rate can be set to the set flow rate Qs with high accuracy by performing feedback control in which the opening degree of the control valve 18 is repeatedly adjusted until the difference ΔQ between the set flow rate Qs and the flow rate Qc obtained by calculation becomes zero or falls within a permissible error range. Such a pressure-type flow rate control device that controls the upstream pressure is disclosed in, for example, Japanese Patent Application Laid-Open No. 2015-109022 filed by the applicant of the present invention. The entire disclosure of Japanese Patent Application Laid-Open No. 2015-109022 is incorporated herein by reference.

In the above-described control operation, the output of the pressure sensor 14 obtained as a result of feedback control of the control valve 18 is converted into the digital pressure signal Sp by the A/D converter 20, and the control circuit 30 generates a flow rate signal Sq as an output signal indicating the flow rate Qc in accordance with the input pressure signal Sp. The digital pressure signal Sp output by the A/D converter 20 includes a quantization error. Thus, the flow rate signal Sq calculated in accordance with the pressure signal Sp also includes a quantization error. As a result, the flow rate signal Sq to be output (displayed) may in some cases swing, in spite of the fact that the actual flow rate of gas passing through the restriction part 12 remains approximately constant.

To address such problems, the pressure-type flow rate control device 10 according to the present embodiment performs correction processing on the flow rate signal and outputs the corrected flow rate signal when the flow rate is stable. As will be described in detail later, the correction processing is selectively performed during a stable flow rate period when the flow rate is stable, excluding a period (transient change period) when the flow rate is considered to fluctuate relatively widely. For example, timing signals indicating the start and end of the correction processing may be generated based on the result of an analysis conducted on a flow rate setting signal, which is input from an external source, by an analyzer provided in the control circuit. A specific example of the correction processing performed when the flow rate is stable will now be described.

Figure 2:
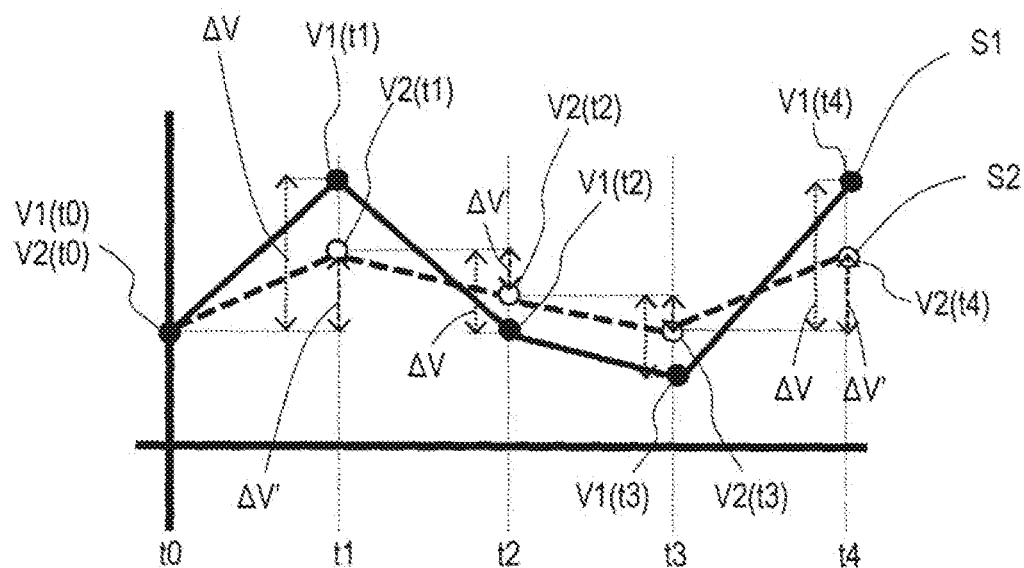
FIG. 2 is a graph showing the relationship between a flow rate output signal before correction (primary signal) and a flow rate output signal after correction (secondary signal).

FIG. 2 is a graph showing a flow rate output signal S1 before correction (hereinafter, may also be referred to as a "primary signal") indicated by the solid line and filled circles, and a flow rate output signal S2 after correction (hereinafter, may also be referred to as a "secondary signal") indicated by the broken line and open circles. The primary signal S1 is a digital signal and is also a flow rate output signal that corresponds to the discrete pressure signal Sp obtained by the A/D converter 20 sampling and quantizing the output of the pressure sensor 14 every control cycle (sampling cycle). The control cycle may be set to 0.5 ms.

As illustrated in FIG. 2, at initial timing t0 (the leftmost point in the graph) at which the correction processing is started, a current value V2(t0) of the secondary signal is set to the same value as a current value V1(t0) of the primary signal. When a current value V1(t1) of the primary signal is given at the next control timing t1, a current value V2(t1) of the secondary signal is set to a value obtained by adding a correction change amount $\Delta V'$ to the previous value V2(t0) of the secondary signal. The correction change amount $\Delta V'$ as used herein is a value obtained by dividing a difference $\Delta V$ between the current value V1(t1) of the primary signal and the previous value V2(t0) of the secondary signal by a predetermined divisor greater than 1. The divisor may be expressed by (variable+1), and the degree of correction can be set arbitrarily by changing the variable.

The above correction change amount $\Delta V'$ is obtained by dividing the above difference $\Delta V$ by a divisor greater than 1 (i.e., multiplying the difference $\Delta V$ by a multiplier less than 1) and is thus always smaller than the difference $\Delta V$. In other words, the current value V2(t1) of the secondary signal is determined so as to take a value between the previous value V2(t0) of the secondary signal and the current value V1(t1) of the primary signal. Thus, the secondary signal exhibits less signal swings than the primary signal.

The above divisor also corresponds to an indicator that represents how much the current value V1(t1) of the primary signal is reflected in the previous value V2(t0) of the secondary signal when determining the current value V2(t1) of the secondary signal. The bigger the divisor, the smaller the change of the secondary signal from the previous value to the current value, and the lesser single swings of the secondary signal. Thus, the above divisor may be set appropriately to a value to which extent that the desired signal stability can be achieved.

The correction processing will now be described, referring again to FIG. 2. When a current value V1(t2) of the primary signal is given at the next control timing t2 after the current value V2(t1) of the secondary signal at the control timing t1 has been obtained as described above, a current value V2(t2) of the secondary signal is determined in the same manner as described above by adding a correction change amount $\Delta V'$ (i.e., a value obtained by dividing the difference $\Delta V$ between the current value V1(t2) of the primary signal and the previous value V2(t1) of the secondary signal by a predetermined divisor greater than 1) to the previous value V2(t1) of the secondary signal. The same applies to the subsequent calculation. That is, a current value V2(t3) of the secondary signal at control timing t3 is calculated by adding a correction change amount $\Delta V'$, which is obtained from a current value V1(t3) of the primary signal and the previous value V2(t2) of the secondary signal, to the previous value V2(t2) of the secondary signal, and a current value V2(t4) of the secondary signal at control timing t4 is obtained by adding a correction change amount $\Delta V'$, which is obtained from a current value V1(t4) of the primary signal and the previous value V2(t3) of the secondary signal, to the previous value V2(t3) of the secondary signal.

In the above-described embodiment, a current value V2(tn) of the secondary signal can be expressed by the following general formula:

$$V2(tn)=V2(tn-1)+a(V1(tn)-V2(tn-1))=aV1(tn)+(1-a)V2(tn-1)$$

where tn is the current control timing and tn-1 is the previous control timing. This formula can be used as a predetermined relational expression for determining the current value V2(tn) of the secondary signal. In this formula, a is a coefficient that satisfies 0<a<1.

In the correction processing described above, the current value of the secondary signal is calculated using the current value of the primary signal and the previous value of the secondary signal, and the previous value of the secondary signal is calculated from the previous value of the primary signal and the second previous value of the secondary signal. The second previous value of the secondary signal is calculated from the second previous value of the primary signal and the third previous value of the secondary signal. That is, tracing back to its origin, the current value of the secondary signal in the above-described correction processing is calculated so as to include information regarding all the current and past values of the primary signal, and corresponds to a value that is assigned a greater weight the closer the value is to the current value. The correction processing using the current value of the primary signal and the previous value of the secondary signal is a favorable mode from the viewpoint of ease of processing and suitable traceability of the primary signal.

The present invention is, however, not limited to this mode, and other modes are also conceivable in which the current value of the secondary signal may be obtained from the current value of the primary signal and any single or plural past values of the primary signal. Embodiments of the present invention may employ various correction methods as long as the current value of the secondary signal is determined by a predetermined relational expression using the current value of the primary signal and a value that includes information regarding the past values of the primary signal.

The correction processing described above is favorably continuously performed during the stable flow rate period. The timing at which the correction processing is performed will now be described.

Figure 3:
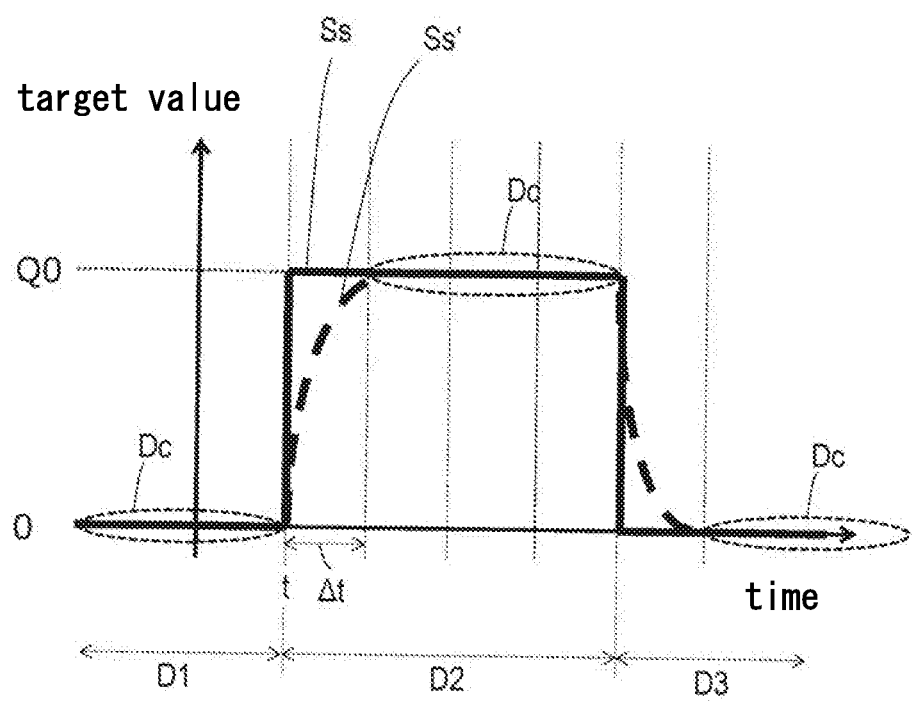
FIG. 3 is a graph showing the relationship between a flow rate setting signal received from an external source and a correction processing period.

FIG. 3 is a graph showing the relationship between a flow rate setting signal (a flow rate setting command) Ss received from an external source by the pressure-type flow rate control device 10 and a period Dc during which the pressure-type flow rate control device 10 performs the correction processing. As illustrated in FIG. 3, the flow rate setting signal Ss is typically given in the form of a rectangular wave that represents a change in the set flow rate over time. In the illustrated example, a first period D1 during which the flow rate is zero is followed by a second period D2 during which the flow rate is at a target flow rate Q0, and the second period D2 is followed by a third period D3 during which the flow rate is again zero.

Inside the pressure-type flow rate control device 10, an internal flow rate setting signal Ss' that corresponds to the flow rate setting signal Ss is generated, and the actual control of the pressure control valve is performed in accordance with the internal flow rate setting signal Ss'. The internal flow rate setting signal Ss' may be generated in accordance with known ramp function control and may be a setting signal with a target value that changes over time. The internal flow rate setting signal Ss' may be generated as a control signal that reaches the target value Q0 over a predetermined period of time when the flow rate setting signal received from an external source indicates transition to the target value Q0.

As is apparent from FIG. 3, when the flow rate setting signal Ss that changes the flow rate from zero to the target value Q0 is given at time t, the pressure-type flow rate control device 10 performs an operation of opening the control valve 18 for a short time during a predetermined period $\Delta t$ from time tin in accordance with the internal flow rate setting signal Ss'.

The upstream pressure P1 and the flow rate Qc change greatly during the predetermined period from the above time t (from t to t+$\Delta t$). Thus, if the above-described correction processing for reducing the range of signal fluctuations is performed during this period, the flow rate signal to be output may exhibit a delay value that differs greatly from the actual flow rate, thus leading to a drop in responsiveness.

In view of this, the correction processing according to the present embodiment is selectively performed during the stable flow rate period, excluding the transient change period in which the upstream pressure and the flow rate change greatly, and is not performed during the transient change period. The transient change period may be set to the predetermined period (from t to t+$\Delta t$) from time t at which the internal flow rate setting signal Ss' changes as illustrated in FIG. 3. Alternatively, if there is a considerable delay in the output signal with respect to the internal flow rate setting signal, the transient change period may be set to a period that is required for the difference between the output signal and the internal flow rate setting signal to decrease to less than or equal to a given value.

While the secondary signal S2 is output as the flow rate signal during the stable flow rate period, the primary signal S1 may be output as the flow rate signal during the transient change period. This allows the flow rate signal to be output/displayed with less signal drift when the flow rate is stable, without incurring a drop in responsiveness.

Although an exemplary embodiment is described above in which the primary signal S1 that has not been corrected is output as the flow rate signal during the transient change period, the present invention is not intended to be limited to this embodiment, and other signals may be output as flow rate signals. For example, a signal with considerably lesser degree of correction than the secondary signal S2 at the time when the flow rate is stable may be output. In order to achieve this, for example, another secondary signal, that is a current value obtained during the above correction processing by adding a previous value to a value divided by a divisor close to 1, may be output during the transient change period, (e.g., a secondary signal generated in the above-described correction processing according to another relational expression, obtained by setting the value of the variable determining the divisor to zero or a value close to zero).

Figure 4:
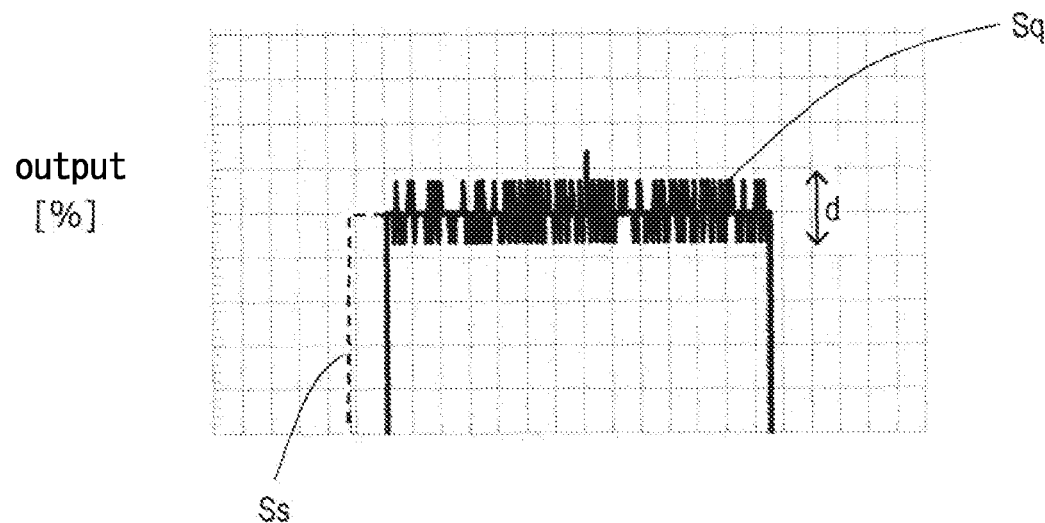
FIG. 4($a$) is a graph showing the primary signal, and FIG. 4($b$) is a graph showing the secondary signal.
Figure 4:
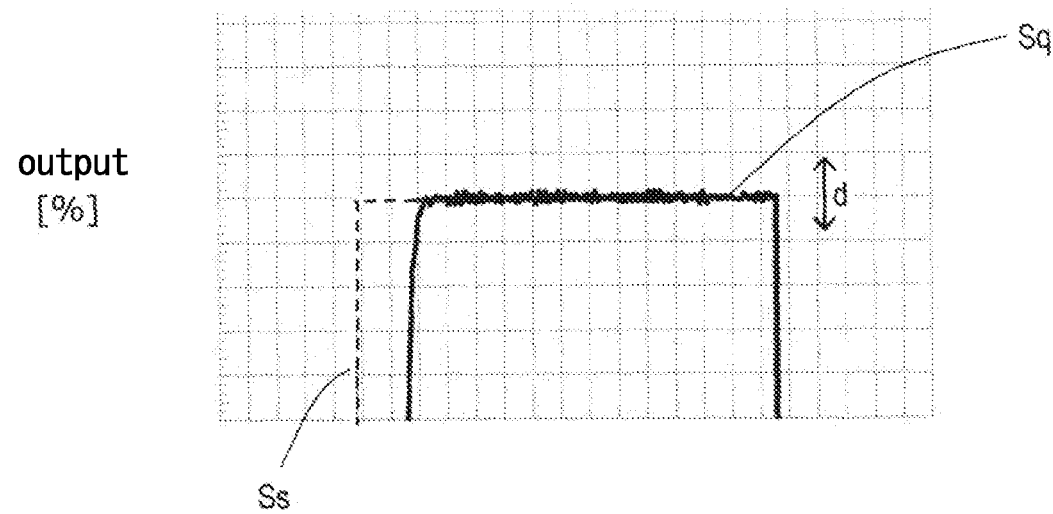

FIG. 4(a) illustrates the flow rate setting signal Ss and the flow rate output signal Sq in the case where the correction processing is not performed, and FIG. 4(b) illustrates the flow rate setting signal and the flow rate output signal Sq in the case where the correction processing is performed. The graph illustrated in FIG. 4(b) shows the case where the divisor is set to (200+1) in the aforementioned correction processing.

As is apparent from FIG. 4(a), in the case where the correction processing is not performed, the flow rate output signal swings relatively widely in a range d due to influences such as quantization errors, even though the flow rate is stable. In contrast, in the case where the correction processing is performed, the range of swings considerably decreases from the range d, and the flow rate output signal takes an approximately constant value, as can be seen from FIG. 4(b). The range of swings after the correction processing is preferably set to a value less than or equal to a quantization error.

While embodiments of the present invention have been described above, needless to say, various modifications are possible. For example, a mode may have the period during which the correction processing is performed designated by a user input. Another mode may have the degree of correction changed according to a target flow rate value.

INDUSTRIAL APPLICABILITY

The flow rate signal correction method according to embodiments of the present invention is suitably applicable to a pressure-type flow rate control device configured to control flow rate by controlling pressure existing upstream of a restriction part.

DESCRIPTION OF REFERENCE SIGNS

10 Pressure-type flow rate control device
12 Restriction part
14 Pressure sensor
16 Temperature sensor
18 Control valve
19 Piezo actuator driver
20, 22 A/D converter
30 Control circuit S1 Primary signal
S2 Secondary signal (corrected signal)
Ss Flow rate setting signal
Sq Flow rate output signal
P1 Upstream pressure
P2 Downstream pressure

The invention claimed is:

1. A flow rate signal correction method applicable to a pressure-type flow rate control device including a restriction part, a pressure sensor disposed upstream of the restriction part, and a control valve disposed upstream of the pressure sensor, and being configured to control a flow rate by controlling pressure existing upstream of the restriction part, wherein the control valve is controlled by a same feedback control based on a flow rate setting signal and an output of the pressure sensor both in a stable flow rate period and a transient change period, while a flow rate output signal externally displayed is generated in a different way between the stable flow rate period and the transient change period, the method comprising steps of:
    generating a primary signal of a digital flow rate output signal indicating a flow rate, in accordance with the output of the pressure sensor while the control valve is feedback controlled based on the flow setting signal, the primary signal including quantization error; and
    generating a secondary signal as a corrected signal of the primary signal such that a current value of the primary signal and a value including information regarding one or a plurality of past values of the primary signal are used to derive a current value corrected according to a predetermined relational expression, the secondary signal including less quantization error than the primary signal,
    wherein the secondary signal is output as the flow rate output signal during the stable flow rate period, and the flow rate setting signal generated in accordance with a predetermined ramp function having a target value to be reached over time is output as the flow rate output signal during the transient change period.

2. The flow rate signal correction method according to claim 1, wherein the value including information regarding one or a plurality of past values of the primary signal is the previous value of the secondary signal.

3. The flow rate signal correction method according to claim 2, wherein the current value of the secondary signal is derived by adding a correction change amount to the previous value of the secondary signal, the correction change amount being calculated in accordance with a difference between the current value of the primary signal and the previous value of the secondary signal.

4. The flow rate signal correction method according to claim 3, wherein the correction change amount is obtained by dividing the difference between the current value of the primary signal and the previous value of the secondary signal by a divisor greater than 1.

5. The flow rate signal correction method according to claim 1, wherein the step of generating the secondary signal and the step of outputting the secondary signal as the flow rate output signal are continuously performed during a period of time from a starting point at which a predetermined period of time has elapsed since a change of the flow rate setting signal occurred to an end point at which a next change of the flow rate setting signal occurs.

6. A flow rate control device configured to output the flow rate output signal using the flow rate signal correction method according to claim 1.

7. A flow rate signal correction method applicable to a pressure-type flow rate control device including a restriction part and being configured to control a flow rate by controlling pressure existing upstream of the restriction part, the method comprising steps of:
    generating a primary signal indicating a flow rate, in accordance with an output of a pressure sensor provided upstream of the restriction part; and
    generating a secondary signal as a corrected signal of the primary signal such that a current value of the primary signal and a value including information regarding one or a plurality of past values of the primary signal are used to derive a current value corrected according to a predetermined relational expression,
    wherein the secondary signal is output as a flow rate output signal externally displayed during a stable flow rate period, and the secondary signal is not output as the flow rate output signal during a transient change period,
    wherein the value including information regarding one or a plurality of past values of the primary signal is the previous value of the secondary signal, and the current value of the secondary signal is derived by adding a correction change amount to the previous value of the secondary signal, the correction change amount being calculated in accordance with a difference between the current value of the primary signal and the previous value of the secondary signal, and
    wherein the correction change amount is obtained by dividing the difference between the current value of the primary signal and the previous value of the secondary signal by a divisor greater than 1.

* * * * *